United States Patent
Richter et al.

(10) Patent No.: US 9,327,654 B2
(45) Date of Patent: May 3, 2016

(54) LADDER RACK SYSTEM

(75) Inventors: Thomas Richter, Sand Creek, MI (US); Rob Sautter, Cement City, MI (US)

(73) Assignee: Adrian Steel Company, Adrian, MI (US)

( * ) Notice: Subject to any disclaimer, the term of this patent is extended or adjusted under 35 U.S.C. 154(b) by 868 days.

(21) Appl. No.: 12/290,943

(22) Filed: Nov. 5, 2008

(65) Prior Publication Data
US 2009/0140021 A1 Jun. 4, 2009

Related U.S. Application Data

(60) Provisional application No. 60/985,451, filed on Nov. 5, 2007.

(51) Int. Cl.
B60R 9/042 (2006.01)
E06C 5/04 (2006.01)

(52) U.S. Cl.
CPC .................. B60R 9/0423 (2013.01); E06C 5/04 (2013.01)

(58) Field of Classification Search
CPC .............................. B60R 9/042; B60R 9/0423
USPC ................................... 224/310; 414/462, 466
See application file for complete search history.

(56) References Cited

U.S. PATENT DOCUMENTS

| | | | | |
|---|---|---|---|---|
| 3,963,136 A * | 6/1976 | Spanke | .......................... | 414/462 |
| 5,058,791 A * | 10/1991 | Henriquez et al. | ............ | 224/310 |
| 5,398,778 A * | 3/1995 | Sexton | ........................... | 182/127 |
| 5,850,891 A * | 12/1998 | Olms et al. | .................... | 182/127 |
| 5,884,824 A * | 3/1999 | Spring, Jr. | ..................... | 224/310 |
| 6,092,972 A * | 7/2000 | Levi | .............................. | 414/462 |
| 6,179,543 B1 * | 1/2001 | Adame et al. | ................. | 414/462 |
| 6,315,181 B1 * | 11/2001 | Bradley et al. | ................ | 224/310 |
| 6,360,930 B1 * | 3/2002 | Flickenger | .................... | 224/310 |
| 6,427,889 B1 * | 8/2002 | Levi | .............................. | 224/315 |
| 6,712,247 B1 * | 3/2004 | Fox | ................................ | 224/310 |
| 6,764,268 B2 * | 7/2004 | Levi | .............................. | 414/462 |
| 6,854,627 B2 * | 2/2005 | Foo et al. | ....................... | 224/310 |
| 6,874,835 B1 * | 4/2005 | Silverness | ......................... | 296/3 |
| 7,097,409 B2 * | 8/2006 | Richter | ........................ | 414/462 |
| 7,549,831 B2 * | 6/2009 | Hendley et al. | .............. | 414/462 |
| 2004/0047716 A1 * | 3/2004 | Hendley et al. | .............. | 414/462 |
| 2006/0065685 A1 * | 3/2006 | Fitzsimmons | ................ | 224/310 |
| 2007/0183875 A1 * | 8/2007 | Thibault | ....................... | 414/462 |

FOREIGN PATENT DOCUMENTS

| | | | |
|---|---|---|---|
| EP | 340076 A1 | * | 11/1989 |
| FR | 2606344 A1 | * | 5/1988 |
| FR | 2654688 A1 | * | 5/1991 |
| GB | 2360751 A | * | 10/2001 |

* cited by examiner

*Primary Examiner* — Justin Larson
(74) *Attorney, Agent, or Firm* — Marshall & Melhorn, LLC

(57) ABSTRACT

A ladder rack for supporting a ladder in a stowage position and for moving the ladder between the stowage position and a loading/unloading position at which the ladder can be loaded onto the rack or unloaded from the rack. The ladder rack includes a frame assembly which is mounted on a support structure such as a vehicle roof and a bed platform having opposite ends that are coupled to the frame assembly for sliding and hinged movement with respect to the frame assembly. At least one of the ends of the bed platform is configured to be extendible when pivoted downward into a loading or unloading position.

7 Claims, 3 Drawing Sheets

LADDER RACK SYSTEM

RELATED APPLICATIONS

The present application is based upon U.S. Provisional Application Ser. No. 60/985,451, filed Nov. 5, 2007 to which priority is claimed under 35 U.S.C. §120 and of which the entire disclosure is hereby expressly incorporated by reference.

TECHNICAL FIELD

The present invention relates to apparatus and methods for loading and unloading ladders onto/from ladder racks mounted on vehicles and other storage positions. More particularly, the present invention is directed to ladder racks that can be moved easily between storage and loading/unloading positions so as to increase ease of ladder loading and unloading for a user.

BACKGROUND ART

Ladders and sometimes other large pieces of equipment are often transported by utility, telephone, and cable TV personnel and by electricians, construction workers, etc. on racks mounted to the roofs of service or work vehicles, including vans, trucks, etc. Loading and unloading of ladders and other equipment from roof-mounted racks requires awkward lifting of heavy, cumbersome ladders, which may result in damage to vehicles or ladders, or strain and injury to persons attempting to load of unload the ladders.

Numerous devices have been developed and used for receiving and securely storing ladders for stationary storage or for transportation. Such devices address a number of considerations that are unique to storing and securing ladders. For example, since most ladders are bulky and long regardless of their weight, it is difficult to store ladders in many locations, particularly upon vehicle roofs. Moreover, the large size and heavy weight of many ladders can make ladder lifting, manipulation, and other movement during storage a difficult and dangerous process. Several ladder racks have been developed to address these problems. However, such ladder racks are typically complex, expensive, and bulky.

Although the storage of ladders in any situation involves some challenge, vehicular applications are particularly problematic. Most conventional vehicle ladder racks require the user to lift the ladder some distance to place the ladder on the rack. This process can be difficult especially when only one person is trying to lift and manipulate a heavy and/or long ladder onto a ladder rack. Some vehicle ladder racks require manipulation of the ladder rack itself after a ladder has been loaded on the rack. Such ladder racks are designed to provide for ladder storage on top of a vehicle or otherwise in a high position on the vehicle. The additional weight of the portion of the ladder rack that has to be manipulated together with the weight of the ladder after a ladder has been loaded thereon increases the total weight that a user of the rack has to manipulate.

A need exists for a ladder rack that can be used in both stationary and vehicular applications, that is easy to use and provides for easy ladder loading/unloading and access, and that can be easily manipulated to move a ladder between ladder storage and loading/unloading positions.

DISCLOSURE OF THE INVENTION

According to various features, characteristics and embodiments of the present invention which will become apparent as the description thereof proceeds, the present invention provides a ladder rack for supporting a ladder in a stowage position and moving the ladder between the stowage position and a loading/unloading position at which the ladder can be loaded onto the rack or unloaded from the rack, said ladder rack including:

a frame assembly comprising at least two cross bows;

a bed platform having opposite ends which are coupled to the frame assembly by hinge guide assemblies, said hinge guide assemblies being both slidingly and pivotally coupled to the frame assembly; and at least one of the hinge assemblies being extendible in a pivoted position with respect to the frame assembly.

The present invention further provides a method of manually unloading a ladder from a stowage position on the top of a vehicle which involves:

providing a ladder rack which includes a frame assembly and a bed platform;

mounting the frame assembly to the top of a vehicle;

providing a ladder mounted on the bed platform;

manually moving opposite ends of the bed assembly outward over a side of the vehicle;

manually pivoting opposite ends of the bed assembly downward alone the side of the vehicle while pivoting the another end of the bed assembly about the fixed pivot point;

extending at least one end of the bed assembly further downward; and removing the ladder from the bed platform.

The present invention also provide a method of manually loading a ladder into a stowage position on the top of a vehicle which involves:

providing a ladder rack which includes a frame assembly and a bed platform;

mounting the frame assembly to the top of a vehicle;

positioning opposite ends of the bed platform down along a side of the vehicle, with at least one end of the bed platform being extended;

mounting a ladder onto the bed platform;

lifting the at least one extended end of the bed platform so that it is no longer extended;

manually pivoting the opposite ends of the bed assembly upward from along the side of the vehicle to above the vehicle; and manually moving the opposite ends of the bed assembly inward over the top of the vehicle.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to a ladder rack that provides for easy loading, unloading and storage of a ladder on the rack. The ladder rack preferably has a bed platform configured to support a ladder loaded thereon and move the ladder between a stowage position above the roof of a vehicle and a loading/unloading position along a side of the vehicle.

The bed platform is coupled to the roof of a vehicle via a base assembly. The base assembly is attached to the vehicle so as to be secured in a fixed position over the roof of the vehicle. Opposite ends of the bed platform are coupled to the base assembly by hinged guide assemblies which allow the opposite ends of the bed platform to move outward and over the side of the vehicle and then pivot downward along side the side of the vehicle. In addition, at least one of the hinged guide assemblies is extendible so that once the bed platform is pivoted into the loading/unloading position the extendible hinged guide assemblies can be further lowered to receive an end of a ladder thereon.

A ladder that is placed on the bed platform can moved together with the bed platform between the loading/unloading position to the stowage position by pivoting both ends of the bed platform together with the hinged guide assemblies and moving the ends of the bed platform with respect to the fixed guide assembly.

The ladder rack of the present invention can be used in any application or environment, but has particular advantages when used on a vehicle. Accordingly, although the ladder rack according to the present invention is described herebelow in reference to a specific use in conjunction with motor vehicles, it is to be understood that this description is presented as a non-limiting example only, and that the description is not intended to indicate or imply that the present invention is limited to vehicular applications. Moreover, while the ladder rack of the present invention is illustrated and described for use on a van, it is to be understood that the ladder rack can also be used on any other type of vehicle.

Figure 1:
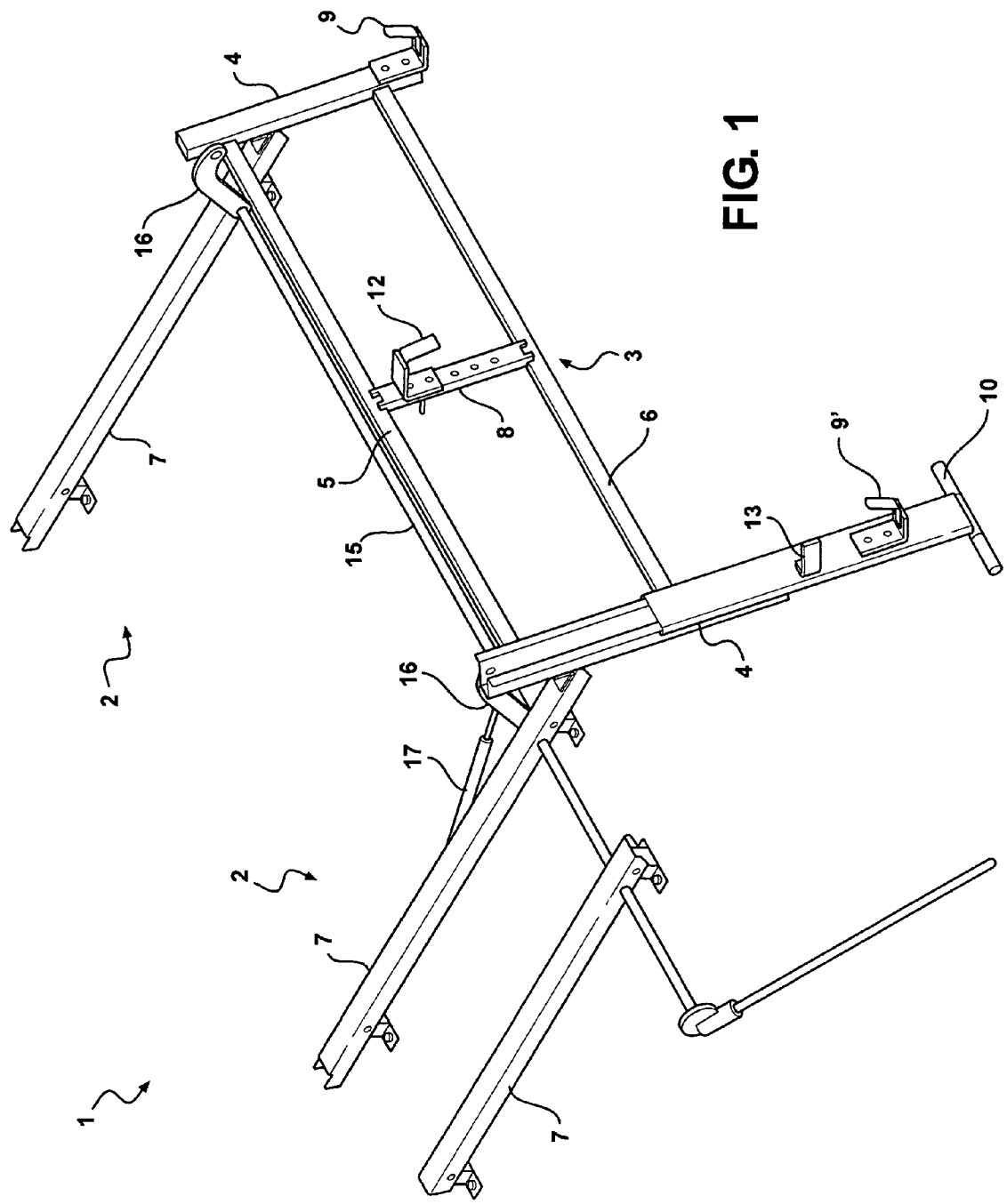
FIG. 1 is a perspective view of a ladder rack according to one embodiment of the present invention, shown in a loading/unloading position.

FIG. 1 is a perspective view of a ladder rack according to one embodiment of the present invention, shown mounted upon a vehicle with the ladder rack in a loading/unloading position. The ladder rack of the present invention which is generally identified by reference numeral 1 includes a base assembly 2, a bed platform 3, and hinged guide assemblies 4. The base assembly 2 provides a support and mounting structure for the bed platform 3, and hinged guide assemblies 4. In the embodiment of the invention shown in FIG. 1, the base assembly 2 includes a plurality of cross bows 7 that extend across the roof of a vehicle. The cross bows 7 which preferably have a shape that generally conforms to the shape of the roof of a vehicle, are mounted on the roof of the vehicle in a conventional manner, and preferably are located at a distance above the roof of vehicle which provides sufficient clearance for objects that are to be stored on the ladder rack 1. Although two cross bows 7 are suitable for a number of vehicular applications, any number of cross bows 7 can be mounted upon various portions of any given vehicle. Cross bows 7 and their manner of attachment are well known to those skilled in the art. It is also possibly to mount the frame assembly 2 to vehicles such as trucks, including pick-up trucks and flatbed trucks that do not have roofs that extend beyond the cab of such vehicles. In such applications a post-supported frame assembly can be incorporated. The bed platform 3 has a length which is substantially equal to the length of the base assembly 2 in FIG. 1, but which could be shorter that the length of the frame assembly 2 as will be understood as the description of the invention proceeds. Whereas the base assembly 2 is depicted as including only cross bows 7, the base assembly can have a generally rectangular shape.

The bed platform 3 includes inboard and outboard side frame portions 5 and 6 that extend between the hinged guide assemblies 4 and a central cross piece 8 as shown.

The hinged guide assemblies 4 are configured to slide along cross bows and pivot about or near the ends of cross bows 7. According to one embodiment, the hinged guide assemblies are configured to move over the cross bows 7 and the cross bows 7 are provided with end hinges or hinged end portions which allow the bed platform 3 to pivot about after the hinged guide assemblies 4 and bed platform 3 is move to the ends of the cross bows 7. In addition, at least one of the hinged guide assemblies is extendible so that once the bed platform is pivoted into the loading/unloading position the extendible end can be further lowered to receive an end of a ladder thereon.

With the ladder rack in the loading/unloading position depicted in FIG. 1, hinge guide assemblies 4 and the bed platform 3 are pivoted about the ends of cross bows 7 so that the bed platform 3 can be positioned over the side of a vehicle. Further, the rear hinge guide assembly 4 has been extended so as to be lower than the front hinge guide assembly 4. In this configuration, one end of a ladder (not shown) can be positioned in ladder grip 9 that is provided at or near the end of the front hinged guide assembly 4 and the opposite end of the ladder can be positioned in ladder grip 9' that is provided near the end of the rear hinged guide assembly 4. As can be understood, this manner of loading a ladder on the hinged guide assemblies 4 avoids having to lift the entire weight of the ladder at once and thus prevents physical injury to one loading or unloading a ladder.

Once a ladder is loaded on the hinged guide assemblies 4 with the ladder rack in the loading position shown in FIG. 1, the extendible rear hinge guide assembly 4 is manipulated into a non-extended configuration by lifting the end thereof. In the illustrated embodiment, a handle 10 is provided to lift the end of the extendible hinge guide assembly 4. The extendible hinge guide assembly 4 comprises a telescoping assembly that can be releasable latched or locked in the non-extended configuration (See FIG. 3). Any suitable mechanical releasable latching or locking structure or assembly can be provided to secure the telescoping assembly in the non-extended configuration, including any convenient latch or lock release trigger, lever, etc.

Figure 2:
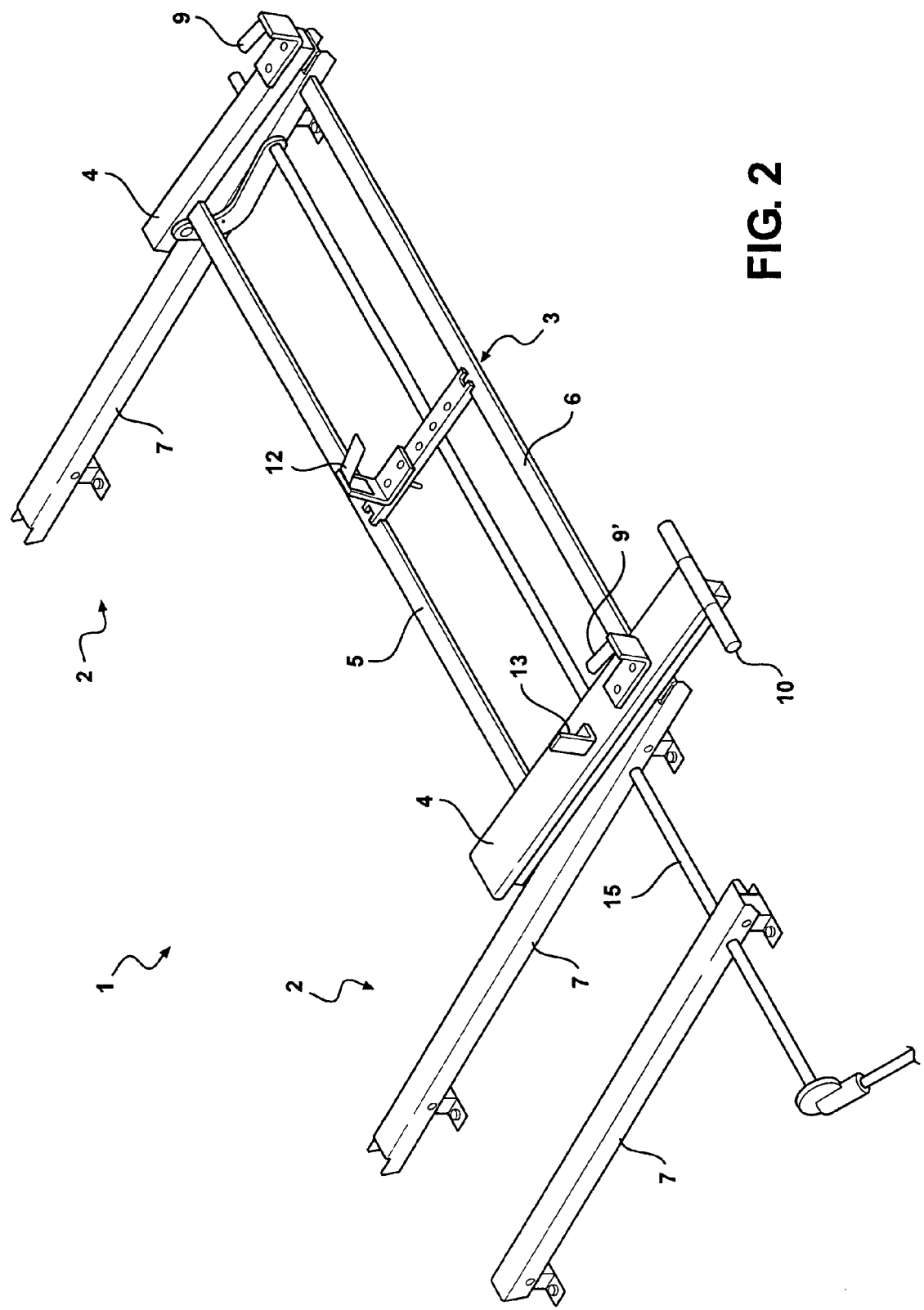
FIG. 2 is a perspective view of the ladder rack of FIG. 1 in a stowage position.

FIG. 2 is a perspective view of the ladder rack of FIG. 1 in a stowage position. In the stowage position, the inboard ends of the hinged guide assemblies 4 are positioned over the ends of the cross bows 7. A mechanical releasable latching or locking mechanism is provided which prevents the hinged guide assemblies 4 from moving over the ends of the cross bows 7 when the bed assembly 2 is in the stowage position. Such a latching or locking mechanism can include any suitable structure that engages between the cross bows 7 and inboard end portions of the hinged guide assemblies 4.

Figure 3:
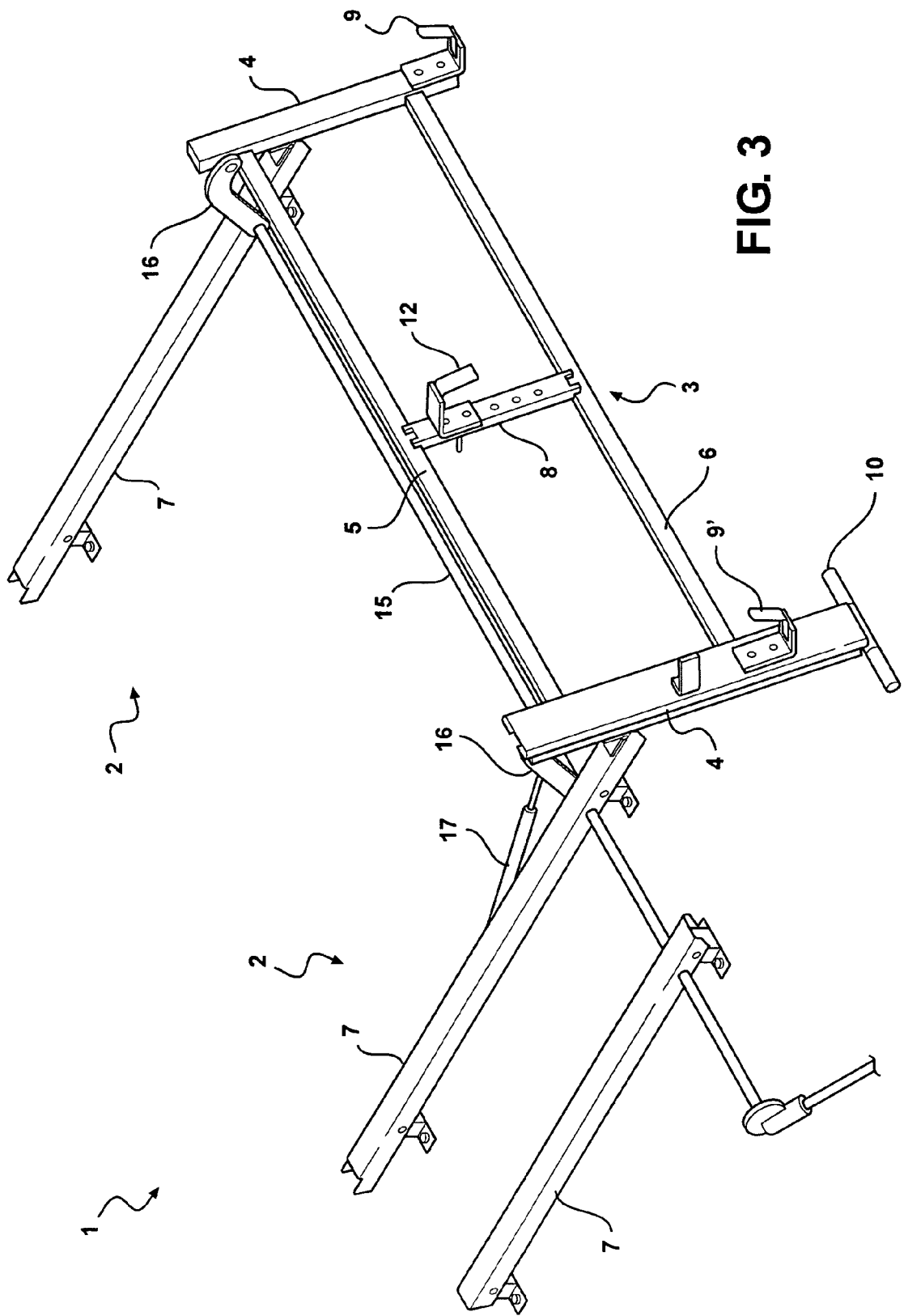
FIG. 3 is a perspective view of the ladder rack of FIG. 1 in an intermediate position between the loading/unloading and stowage positions.

In the embodiment of the invention best shown in FIG. 3, the hinged guide assemblies 4 are pivotally connected to a torsion bar 15 by arms or brackets 16 that are pivotally coupled to the cross bows 7. When the torsion bar 15 is rotated clockwise as shown in FIG. 3, the arms or brackets 16 pivot upward and outward and lift and rotate the inboard ends of the hinged guide assemblies 4 over the outboard ends of the cross bows 7. In this embodiment, the hinged guide assemblies 4 are configured to both pivot and slide with respect to the ends of the cross bows 7. When the torsion bar 15 is rotated counter clockwise as shown in FIG. 3, the arms or brackets 16 pivot inward and downward and pull and rotate the inboard ends of the hinged guide assemblies 4 back over the outboard ends of the cross bows 7 and into the stowed position.

According to an alternative embodiment, the rear hinge guide assembly 4 can include a pivotal sliding guide that along which the hinged guide assembly 4 slides and with which the hinged guide assembly pivots about the end of the cross bow 7. Such a pivotal sliding guide would be pivotally coupled to the end of the cross bow 7 and releaseably coupled to in inboard portion of the cross bow 7. When coupled to the cross bow 7 the pivotal sliding guide would allow the hinged guide assembly to slide with respect to the cross bow. When released from the cross bow 7 the pivotal sliding guide would allow the hinged guide assembly 4 to pivot about the outboard end of the cross bow 7. Such a pivotal sliding guide could be provided beneath the inboard end of the rear hinged guide assembly 4 in FIG. 3.

A ladder on the ladder rack 1 is held in position by ladder grips 9 and 9' provided on the hinged guide assemblies and an opposed ladder grip 12 that is provided on central cross piece 8 of the bed platform 2. In addition to the ladder grips 9, 9' and 12 which secure a ladder from moving sideways, the ladder rack 1 is can also be provided with one or more pair rung grip 13 which secure a ladder from moving along its longitudinal axis. The ladder grips 9, 9' and 12 can be adjustable so as to be used with and engage ladders of different sizes. It is to be understood that various configurations of ladder grips and rung grips can be incorporated and used in the ladder rack of the present invention. Additional means such as cable, cable locks, safety straps, lock hasps, etc. can be used to further secure the ladder to the ladder rack and/or to prevent or discourage theft of a ladder stored on the ladder rack. The ladder grips 9, 9' and 12 and/or rung grip 13 can be covered or coated with a polymeric material or a resilient deformable material such as rubber or urethane pieces or foam to increase gripping strength. In addition the cover or coating can be textured, ribbed, dimpled, grooved, curved, or otherwise shaped to prevent slippage.

FIG. 3 is a perspective view of the ladder rack of FIG. 1 in an intermediate position between the loading/unloading and stowage positions in which the hinged guide assembly is aligned with the fixed guide assembly. In the intermediate position shown FIG. 3, the hinged guide assemblies 4 have been moved over the ends of the cross bows 7 and pivoted downward so that the bed platform 3 is position along the side of a vehicle to which the ladder rack 1 is attached. The bed platform 3 is manually moved from the stowage position shown in FIG. 2 to the intermediate position shown in FIG. 3 by pivoting the inboard ends of the hinged guide assemblies 4 upward and over the outboard ends of the cross bows 7 and on top of the cross bows 7. According to one embodiment, the entire movement is effected by pivoting the torsion bar 15 and arms or brackets 16. According to another embodiment, the hinged guide assemblies can be configured to slide over the cross bows 7 and the cross bows 7 are provided with end hinge elements or hinged end portions which allow the bed platform 3 to pivot about after the hinged guide assemblies 4 and bed platform 3 is slide to the ends of the cross bows 7. In an embodiment in which the cross bows 7 are provided with end hinge elements, such end hinge elements can comprise pivot pins which can be engaged by complementarily curved shaped structure(s) provided beneath inboard ends of the hinged guide assemblies 4.

According to a further embodiment of the present invention, inboard end portions of the hinged guide assemblies 4 can be configured to slidingly engage a length of the cross bows 7 so that such sliding engagement is released once the hinged guide assemblies are moved outwardly to the position about which they pivot downwardly.

In order to assist in controlling movement of the ladder rack 1 between the intermediate position depicted in FIG. 3 and the loading/unloading position shown in FIG. 1 a mechanical and/or hydraulic dampener 17 or a spring element can be provided which is coupled between the bed platform 3 and the frame assembly 2 at or near a corner of the bed platform 3. Such a dampener 17 will reduces or dampens the weight that an operator would normally have to lift when moving the ladder rack 1 from the loading position to the intermediate position, and the weight that an operator would normally have to control when moving the ladder rack 1 from the intermediate position to the unloading position.

Once the ladder is positioned on the bed platform 3, the operator can life the bed platform and pivot hinged guide assemblies 4 upward and move the hinged guide assemblies 4 over onto the cross bows 7 and into the stowed position using the torsion bar 15.

To unload a stowed ladder from the latter rack 1, the process is reversed, with the operator first manually releasing the hinged guide assemblies 4 and pivoting and sliding them over the outboard ends of the cross bows 7. Next the extendible hinge guide assembly (or assemblies) is extended for loading or unloading of a ladder.

Ladders can be loaded in the ladder rack in either direction. Moreover, the ladder rack could be mounted on a vehicle in a manner that is opposite to that depicted in the drawings. It is also possible to mount two ladders racks according to the present invention on opposite sides of a vehicle roof if desired.

The various elements of the present invention are preferably made of a relatively strong and resilient material such as steel, aluminum, iron, or other metal, plastic, fiberglass, composites, or combinations thereof. However, the materials of the rung grips and ladder grips and the bearing elements can be made of materials as described above.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A ladder rack secured to a roof of a vehicle for supporting a ladder in a stowage position and moving the ladder between the stowage position and a loading/unloading position at which the ladder can be loaded onto the rack or unloaded from the rack, said ladder rack comprising:

a frame assembly having at least two cross bows, wherein the at least two cross bows extend substantially parallel to one another across a roof of the vehicle and are secured thereto;

a bed platform having an inboard side frame portion, an opposed outboard side frame portion, and a cross piece member joined to and transverse said inboard and outboard side frame portions; and opposing hinged guide assemblies having ladder grips having the same orientation as each other; interconnecting each of the opposite ends of the bed platform to a corresponding cross bow of the frame assembly, wherein an upper end of each of the hinged guide assemblies is fixedly and pivotally connected to an upper end of an arm, and a lower end of the arm is pivotally coupled to the at least two cross bows;

said cross piece member equipped with a ladder grip in opposed engagement orientation to said hinge guide ladder grips;

wherein at least one of the hinged guide assemblies is telescopically extendible in the loading/unloading position of the bed platform;

and each of the hinged guide assemblies translate along the corresponding cross bow as the arm pivots inwardly in moving the bed platform between the loading/unloading position and the stowage position.

2. A ladder rack according to claim 1, wherein the torsion bar is pivotally connected to the cross bows so that rotating the torsion bar causes the arm and the corresponding hinged guide assembly to pivot about outboard ends of the cross bows.

3. A ladder rack according to claim 1, wherein the torsion bar includes a lever for rotating the torsion bar.

4. A ladder rack according to claim 1, further comprising a pivotal sliding guide positioned at the outboard ends of the cross bows through which the hinged guide assemblies slide and with which the hinged guide assemblies pivot about the ends of the cross bows.

5. A ladder rack according to claim 1, wherein the at least one extendible hinged guide assembly includes a handle at a free end thereof.

6. A ladder rack according to claim 1, further comprising one of a mechanical dampener, a hydraulic dampener or a spring element coupled between the bed platform and frame assembly.

7. A ladder rack according to claim 1, wherein the frame assembly and the bed platform have a substantially equal length.

* * * * *